Dec. 28, 1937.   T. V. BUCKWALTER   2,103,978
LOCOMOTIVE RUNNING GEAR
Filed Feb. 8, 1937   3 Sheets-Sheet 1
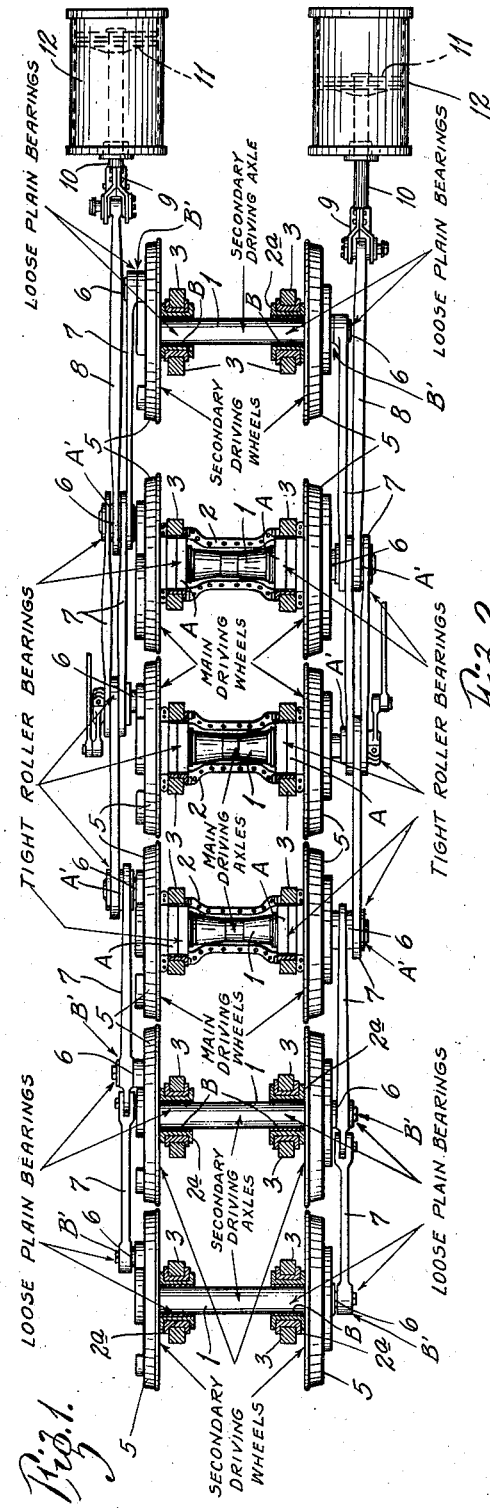
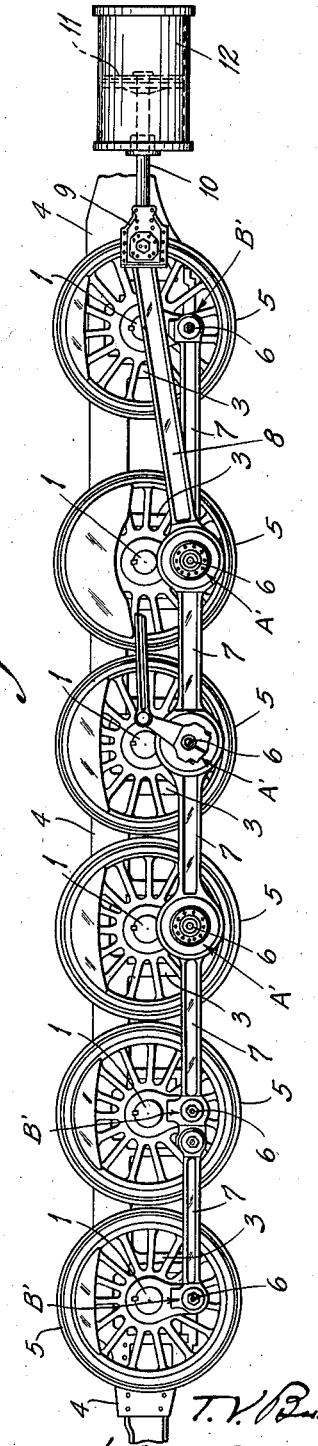

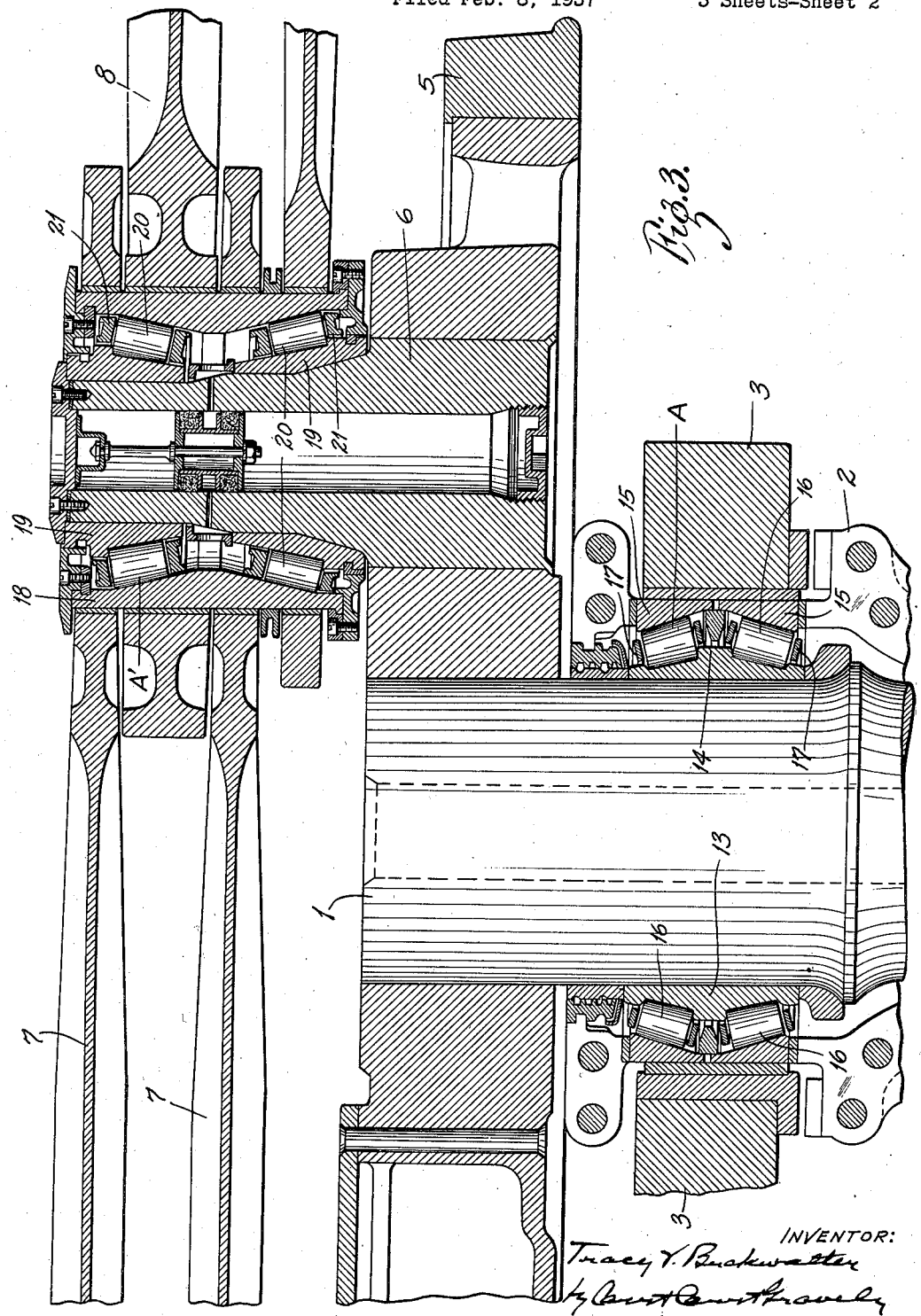

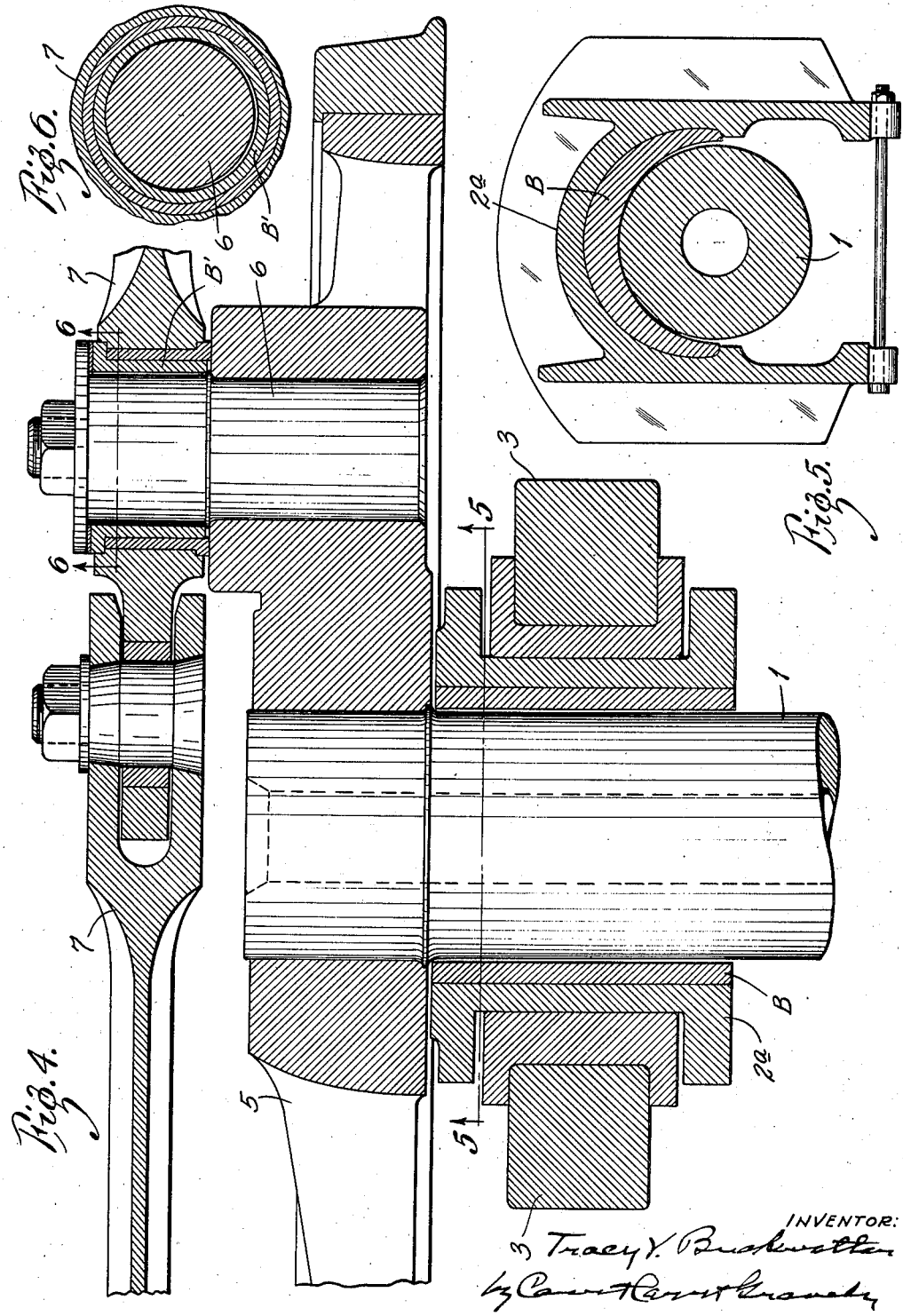

Patented Dec. 28, 1937

2,103,978

UNITED STATES PATENT OFFICE 2,103,978

LOCOMOTIVE RUNNING GEAR

Tracy V. Buckwalter, Canton, Ohio, assignor to The Timken Roller Bearing Company, Canton, Ohio, a corporation of Ohio Application February 8, 1937, Serial No. 124,580

7 Claims. (Cl. 105—84)

My invention relates to locomotive running gear. One of my principal objects is to minimize wear and prolong the life of some of the bearings of a locomotive running gear. Another principal object is to approximate with a limited number of roller bearings the advantages that a full complement of roller bearings confers on a locomotive running gear.

The invention consists principally in a locomotive running gear wherein the bearings associated with the main driving pins and axles are relatively close fitting bearings and the bearings associated with the other driving pins and axles have relatively loose fits whereby the latter will be relieved of driving duty when conditions are such that the main driving wheels alone are able to provide the required adhesion to the rails. The invention further consists in equipping the main driving pins and axles with relatively close fitting roller bearings and equipping the other driving pins and axles with relatively loose fitting plain bearings. The invention also consists in the arrangements and combination of parts hereinafter described and claimed.

In the accompanying drawings, which form part of this specification and wherein like symbols refer to like parts wherever they occur, Fig. 1 is a plan view of a locomotive running gear embodying my invention, Fig. 2 is a side elevation thereof, Fig. 3 is an enlarged fragmentary longitudinal section showing the taper roller bearings for the main driving axle and the crank pin of the main driving wheel associated therewith, Fig. 4 is a view similar to Fig. 3, showing the plain bearings for one of the secondary driving axles and the crank pin of the secondary driving wheel associated therewith; and Figs. 5 and 6 are cross-sections on the lines 5—5 and 6—6, respectively in Fig. 4.

The locomotive running gear illustrated in the accompanying drawings is of a well known type. It comprises six driving axles 1 enclosed in split housings 2 or journal boxes 2a mounted in openings defined by pedestals 3 in a conventional locomotive side truck frame 4. Each axle has two driving wheels 5, each wheel having a crank pin 6, the crank pins of adjacent axles being connected by coupling rods 7 and the crank pins of one axle being connected by main rods 8 to crossheads 9 which, in turn, are connected by piston rods 10 to pistons 11 inside of cylinders 12, all in accordance with familiar practice.

In the construction illustrated in the drawings, taper roller bearings A are interposed between axles 1 and the housings 2 of the second, third and fourth axles, respectively, and taper roller bearings A' are also interposed between the crank pins 6 of the second, third and fourth pairs of driving wheels 5 and the coupling rods 7 thereof, respectively. The bearings for the other axles are plain bearings B in the form of conventional crowned journal bearings that are interposed between said other axles and the journal boxes 2a therefor, respectively, and the bearings for the other crank pins are plain bearings B' in the form of cylindrical sleeves or bushings that are interposed between said other crank pins and the coupling rods thereof, respectively. Hereinafter, those driving wheels whose crank pins are equipped with roller bearings are called the main driving wheels and those axles on which they are mounted are called the main driving axles. The other wheels and axles may be called secondary driving wheels and secondary driving axles.

The taper roller bearing A illustrated in the drawings as applied to the main driving axles comprises a cone or inner raceway member 13 pressed or otherwise tightly fitted on the axle and having two conical inner raceways arranged with their large ends opposite each other and with a thrust rib 14 between them. This bearing also comprises conical cups or outer raceway members 15 for the respective inner raceways suitably mounted in the housings therefor. Between the inner and outer raceway members are two circular rows or series of taper rollers 16 and cages 17 therefor. The bearing thus described is of a well known type of roller bearing and may be replaced with taper roller bearings of other types or with a different type of rollers or even plain bearings provided it is capable of close adjustment.

The taper roller bearings A' on the main crank pins are shown as of a somewhat different type from those on the axles; but they also are well known. The crank pin bearings illustrated comprise a one-piece tubular outer raceway member 18 with two conical raceways arranged with their small ends opposite each other. Opposite each outer raceway is a cone or inner raceway member 19 suitably mounted and axially adjustable on the crank pin. A circular row or series of taper rollers 20, together with a suitable cage 21 therefor, are interposed between each set of raceways.

One of the particular advantages of a taper roller bearing in this connection is that it may be made and adjusted with the greatest nicety. In practice, the looseness or radial play of the taper roller bearings A' on their crank pins need not be more than one-thousandth of an inch. On the other hand, it is standard practice with new locomotives to make the brass bushing B' one thirty-second (.03125) of an inch larger in diameter than the crank pin and to keep the bushing in service until wear increases its diameter to one-eighth of an inch or more above the diameter of the crank pin. Thus, in practice, the taper roller bearing is not only capable of being made to fit with precision but it wears very slowly and any wear can be taken up by adjustment; whereas it is not practicable to have so close a fit initially with a brass bushing, it wears fairly rapidly, and its wear cannot be compensated by adjustment but necessitates replacement of the bushing.

In practice, it is desirable that the taper roller bearings A on the main driving axles of my locomotive running gear be adjusted to allow a radial play or looseness of said bearings on said axles of about two to five thousandths of an inch; and it is also desirable that the taper roller bearings A' on the crank pins of the main driving wheels be adjusted to allow a radial play or looseness of the bearings on the crank pins of about one thousandth of an inch. On the other hand, standard practice with reference to new locomotives with plain bearings is to provide an initial looseness of one thirty-second (or .03125) of an inch on the diameter between the crank pin and the coupling rod and an initial looseness of one-sixteenth (or .0625) of an inch on the diameter between the axle and the journal box in the frame. Thus, where taper roller bearings are used, there is a total looseness or play (exclusive of the play of the box in the frame) of about four thousandths of an inch made up of about one thousandth at the crank pin and three thousandths, more or less, at the axle; whereas the total looseness at the plain bearings (exclusive of play of the box in the frame) is three thirty-seconds (or .09375) or more made up of one thirty-second at the crank pin and one-sixteenth at the axle.

The relatively tight fitting of the tapered roller bearings and the relatively loose fitting of the plain bearings is of considerable significance and may be illustrated by a specific example. Suppose that a drawbar pull of from sixty to ninety thousand pounds is needed to start a heavy train, and further suppose that the six main driving wheels will not have sufficient adhesion or grip on the rails to absorb and transmit the power required for such drawbar pull. In such case, the main driving wheels would spin or slip on the rails except for the fact that the secondary driving wheels are automatically brought into operation to supplement the main driving wheels. When all twelve driving wheels work together, their grip or adhesion to the rails is ample to start the train quickly and to accelerate its speed rapidly to full running speed; but when, or even before, the train attains such speed, the draw bar pull required to maintain such speed is reduced considerably, say, down to the neighborhood of fifty thousand pounds or lower. Under these conditions the main driving wheels alone have ample adhesion to maintain the running speed of the train without any assistance from the secondary driving wheels. Considering, therefore, that the main driving wheels, due to the relatively tight fit of the bearings thereof and of their crank pins, act in synchronism and as a unitary combination which of itself has sufficient grip on the rails to maintain the speed of the train, and considering further that the relatively loose fitting bearings of the other axles and crank pins allow appreciable play of the secondary coupling rods from power transmitting position, it is seen that the secondary driving wheels do little or no work after the train has reached a speed that can be maintained by the main driving wheels alone. Consequently the secondary driving wheels are, to a large extent, relieved of driving duty as soon as the train reaches such speed, so that the wear and tear on the plain bearings is very much reduced.

One of the great advantages of my invention is that, at running speed, the locomotive driving gear has the advantages, or at least a considerable portion of the advantages that are incident to the use of roller bearings, because, at such speed, the driving effort is transmitted through these roller bearings while the secondary driving wheels, at running speed, do not act as drivers but after the manner of trailers. While taper roller bearings are especially advantageous, roller bearings of other types or other relatively tight-fitting bearings may be used on the main driving axles and crank pins in connection with relatively loose-fitting bearings on the secondary axles and crank pins.

While I have illustrated a running gear with six axles, it is obvious that the invention is applicable to running gear with a different number of axles.

What I claim is:

1. A locomotive running gear comprising a main driving axle and crank pins and a secondary driving axle and crank pins, roller bearings for said main driving axle and crank pins, and plain bearings for said secondary axle and crank pins, said roller bearings being initially relatively tight and said plain bearings being initially relatively loose.

2. A locomotive running gear comprising a plurality of axles having main driving wheels and crank pins thereon, a plurality of axles having secondary driving wheels and crank pins thereon and coupling rods connecting the crank pins of the main driving wheels with the crank pins of the secondary driving wheels, relatively tight-fitting roller bearings interposed between the coupling rods and the respective crank pins on the main driving wheels and relatively loose-fitting plain bearings interposed between said coupling rods and the respective crank pins of the secondary driving wheels, main rods connected to a source of power, and a roller bearing interposed between each main rod and a crank pin on a main driving wheel, and whereby the secondary driving wheels suppplement the tractive adhesion of the main driving wheels when the adhesion of the latter is insufficient to propel the locomotive and whereby said secondary driving wheels are substantially relieved from driving duty when the adhesion of the main driving wheels is sufficient by itself.

3. A locomotive running gear wherein there are main driving axles and crank pins equipped with taper roller bearings capable of close adjustment and secondary driving axles and crank pins equipped with relatively loose fitting plain bearings, whereby the wheels on the secondary driving axles will participate in the driving effort when the tractive adhesion of the main driving wheels alone is insufficient for propulsion and whereby the wheels on the secondary driving axles will be automatically relieved from driving effort when the tractive adhesion of the main driving wheels is sufficient for the locomotive.

4. A locomotive running gear comprising a plurality of axles having main driving wheels thereon, a plurality of axles having secondary driving wheels thereon and coupling rods and wherein those coupling rods which connect the main driving wheels have bearings which are relatively tight fitting in normal condition of wear and the other coupling rods have bearings which are relatively loose fitting before wear whereby the adhesion of the secondary driving wheels supplements the adhesion of the main driving wheels when the adhesion of the latter is insufficient for the propulsion of the locomotive and whereby said secondary driving wheels are substantially relieved from driving duty when the adhesion of the main driving wheels is sufficient by itself.

5. A locomotive running gear comprising a plurality of axles having main driving wheels thereon, a plurality of axles having secondary driving wheels thereon and coupling rods and wherein those coupling rods that connect the main driving wheels are equipped with taper roller bearings capable of close adjustment and the other coupling rods have plain bearings of relatively loose fit, whereby the coupling rods with plain bearings will participate in the driving effort when the adhesion of the main driving wheels alone is insufficient to effect locomotion and will be automatically relieved from driving duty when the adhesion of the main driving wheels is sufficient for effecting locomotion.

6. A locomotive running gear which comprises main driving axles having wheels and crank pins thereon, secondary driving axles having wheels and crank pins thereon, coupling rods, relatively tight-fitting roller bearings between the crank pins on the main driving wheels and the respective coupling rods, and relatively loose-fitting plain bearings between the crank pins on the secondary driving wheels and said coupling rods.

7. A locomotive running gear comprising a plurality of axles having main driving wheels and crank pins thereon, a plurality of axles having secondary driving wheels and crank pins thereon and coupling rods connecting the crank pins of the main driving wheels with the crank pins of the secondary driving wheels, relatively tight-fitting roller bearings interposed between the coupling rods and the respective crank pins on the main driving wheels and relatively loose-fitting plain bearings interposed between said coupling rods and the respective crank pins of the secondary driving wheels.

TRACY V. BUCKWALTER.